US 7,929,913 B2

(12) United States Patent
Li et al.

(10) Patent No.: US 7,929,913 B2
(45) Date of Patent: Apr. 19, 2011

(54) ADAPTIVE RECEIVER ARCHITECTURE

(75) Inventors: Qinghua Li, Pleasanton, CA (US);
Leslie A. Rusch, Quebec (CA)

(73) Assignee: Intel Corporation, Santa Clara, CA (US)

( * ) Notice: Subject to any disclaimer, the term of this patent is extended or adjusted under 35 U.S.C. 154(b) by 2476 days.

(21) Appl. No.: 10/321,024

(22) Filed: Dec. 16, 2002

(65) Prior Publication Data

US 2004/0203401 A1    Oct. 14, 2004

(51) Int. Cl.
*H04B 1/00* (2006.01)
(52) U.S. Cl. ........................ 455/63.1; 375/346
(58) Field of Classification Search ............ 455/63, 455/422, 23, 40, 41, 63.1, 422.1, 41.1; 375/346, 375/279
See application file for complete search history.

(56) References Cited

U.S. PATENT DOCUMENTS

| | | | |
|---|---|---|---|
| 4,673,982 A * | 6/1987 | Tam et al. | 348/607 |
| 6,466,566 B1 * | 10/2002 | De Gaudenzi et al. | 370/342 |
| 7,177,341 B2 * | 2/2007 | McCorkle | 375/130 |
| 2002/0015401 A1 * | 2/2002 | Subramanian et al. | 370/347 |
| 2002/0034191 A1 * | 3/2002 | Shattil | 370/464 |
| 2002/0064245 A1 * | 5/2002 | McCorkle | 375/346 |
| 2003/0054764 A1 * | 3/2003 | McCorkle et al. | 455/40 |
| 2003/0067963 A1 * | 4/2003 | Miller et al. | 375/130 |
| 2003/0162498 A1 * | 8/2003 | Rofheart et al. | 455/41 |
| 2004/0022335 A1 * | 2/2004 | Arslan et al. | 375/346 |
| 2004/0042561 A1 * | 3/2004 | Ho et al. | 375/316 |

FOREIGN PATENT DOCUMENTS

| | | |
|---|---|---|
| CN | 1144992 | 3/1997 |
| EP | 0193445 | 6/2001 |

OTHER PUBLICATIONS

Haykin, et al., Adaptive Filter Theory, Third Edition, Publishing house of electronics industry,"Least-Mean-Square Algorithm", Chapter 9, pp. 365-371.
Compton, Jr., "Adaptive Antennas", Concepts and Performance, Prentice Hall, Englewood Cliffs, New Jersey, 44 Pgs.
Li Q. et al., "Multiuser Detection for DS-DDMAL UWB in the Home Environment", IEEE Journal, New York, vol. 20, No. 9, Dec. 2002, pp. 1701-1711.
Foerster J. et al., "Ultra-Wideband Technology for Short or Medium Range Wireless Communications", Intel Technology Journal, XX, US, 2001, pp. 1-10.
Bergel, I., Fishler E., Messer H., "Narrow-band Interference Suppression In Time-Hopping Impulse-Radio Systems", IEEE Conference, Online, May 2002, <URL:http://ieeexplore.ieee.org/iel5/7878/21705/01006380.pdf?tp=$arnumber=1006380 &isnumber=21705>.
Knepp D L, et al., "Frequency-Selective Scintillation Effects and Decision Feedback Equalization in High Data-Rate Satellite Links", IEEE, vol. 71, No. 6, Jun. 1983, pp. 754-767.
Notice of Preliminary Rejection for Korean Patent Application Number 10-2005-7010892 mailed Aug. 29, 2006, 3 pgs.
First Office Action for Chinese Patent Application Number 200380106345.5 mailed Jun. 8, 2007, 10 pgs.

* cited by examiner

*Primary Examiner* — Nay Maung
*Assistant Examiner* — Angelica M Perez
(74) *Attorney, Agent, or Firm* — Blakely, Sokoloff, Taylor & Zafman LLP (57) ABSTRACT

The present disclosure relates to an apparatus and technique for a wireless communications receiver architecture and, more particularly, to an apparatus and technique for an analog adaptive receiver architecture.

24 Claims, 7 Drawing Sheets

ADAPTIVE RECEIVER ARCHITECTURE

BACKGROUND

1. Field

The present disclosure relates to an apparatus and technique for a wireless communications receiver architecture and, more particularly, to an apparatus and technique for an analog adaptive receiver architecture.

2. Background Information

Typically, wireless signals are subject to interference. This interference may come from many different sources, such as, multiple-access interference (MAI) that may originate in the wireless network, other wideband interference, for example, signals from a similar wireless network using the same frequency band, or narrowband interference, for example, signals from a dissimilar wireless network using the same frequency band. These interfering signals may have a greater received power than the typical additive white noise and may be a principal source of error. In addition, a time-variant multi-path channel, or frequency band, generates detrimental inter-symbol interference and time-variant fading in a received signal. Both the multi-access interference and multipath fading may limit the performance of a wireless multi-access system. Traditionally, techniques for addressing these issues for UWB communications include a digital differential phase shift key (DPSK) demodulation or the use of a RAKE receiver.

Figure 1:
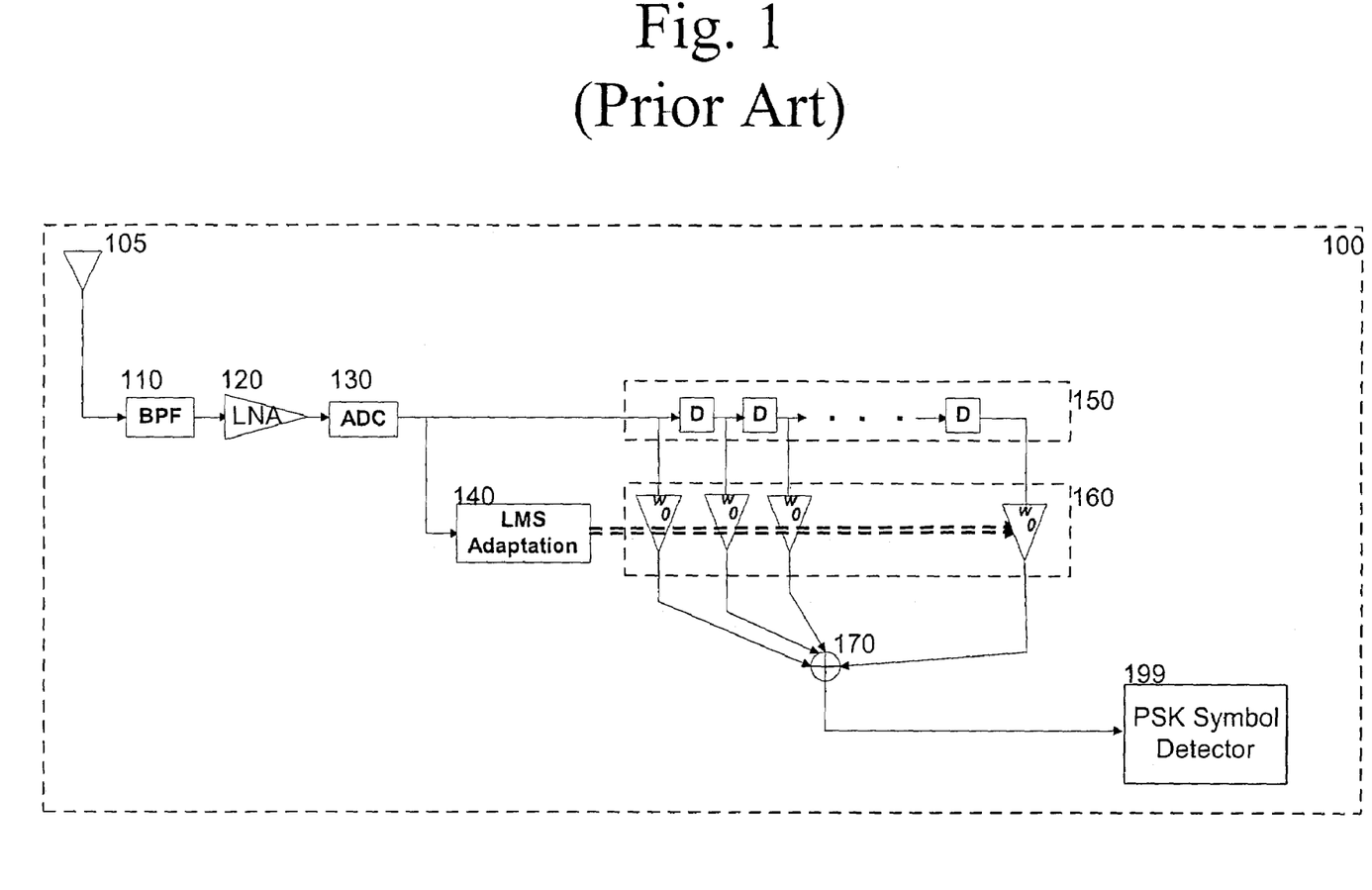
FIG. 1 is a block diagram illustrating a traditional DPSK receiver.

FIG. 1 is a block diagram illustrating a traditional DPSK receiver 100 that utilizes a least-means squared (LMS) filter. The traditional DPSK receiver may include an antenna 105, a bandpass filter 110, a low-noise amplifier 120, an analog-to-digital converter 130 and a LMS filter 140. The conventional implementation of a least-means squared (LMS) filter requires storage components 150, if the observation window size in the filter is greater than one symbol duration. The delayed signals are assigned weights 160 and summed 170 before being sent to the PSK symbol detector 199. Conventionally, the PSK symbol detector extracts information from the received and filtered signals. Often, however, the DPSK receiver does not allows the UWB signal to be sampled at the Nyquist rate at a low cost. Alternatively, the DPSK receiver may use a delay spread, or observation window, for the UWB channel of less than a one symbol duration. Also, a DPSK receiver is subject to intersymbol interference (ISI) and noise amplification.

Figure 2:
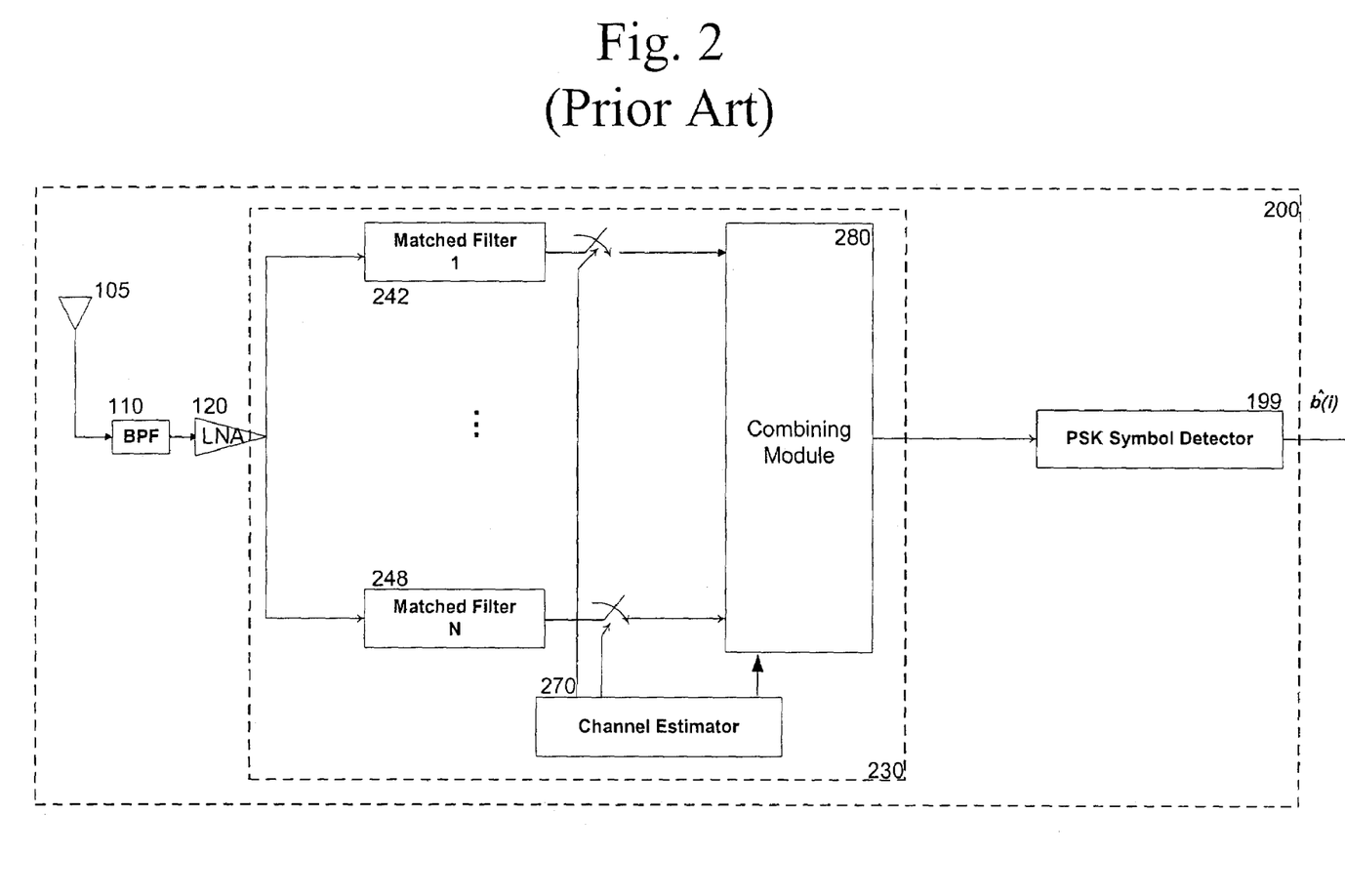
FIG. 2 is a block diagram illustrating a traditional RAKE filter receiver.

FIG. 2 is a block diagram illustrating a traditional RAKE filter receiver 200. The traditional RAKE filter receiver may include an antenna 105, a bandpass filter 110, a low-noise amplifier 120, and a PSK symbol detector 199. The RAKE filter 230 consists of multiple correlators or matched filters 242 & 248, in which the received signal is multiplied by time-shifted versions of a locally generated code sequence. The local reference signal may be stored within the matched filters 242 & 248. The module 270 often provides timing when the switches should open and close. Module 270 may also provide channel information, such as, for example, channel gains on each path to the combining module. The RAKE filter often separates signals such that each finger only processes signals received via a single (resolvable) path. A conventional RAKE filter employs a combining module 280, such as, for example, a maximum ratio combiner or equal gain combiner, to combine the signal energy distributed in the paths. Like the DPSK receiver of FIG. 1, the combining module 280, of FIG. 2, is often subject to intersymbol interference (ISI) and multiple-access interference (MAI).

BRIEF DESCRIPTION OF THE DRAWINGS

Subject matter is particularly pointed out and distinctly claimed in the concluding portions of the specification. The claimed subject matter, however, both as to organization and the method of operation, together with objects, features and advantages thereof, may be best understood by a reference to the following detailed description when read with the accompanying drawings in which:

DETAILED DESCRIPTION

In the following detailed description, numerous details are set forth in order to provide a thorough understanding of the present disclosed subject matter. However, it will be understood by those skilled in the art that the disclosed subject matter may be practiced without these specific details. In other instances, well-known methods, procedures, components, and circuits have not been described in detail so as to not obscure the disclosed subject matter.

Figure 3:
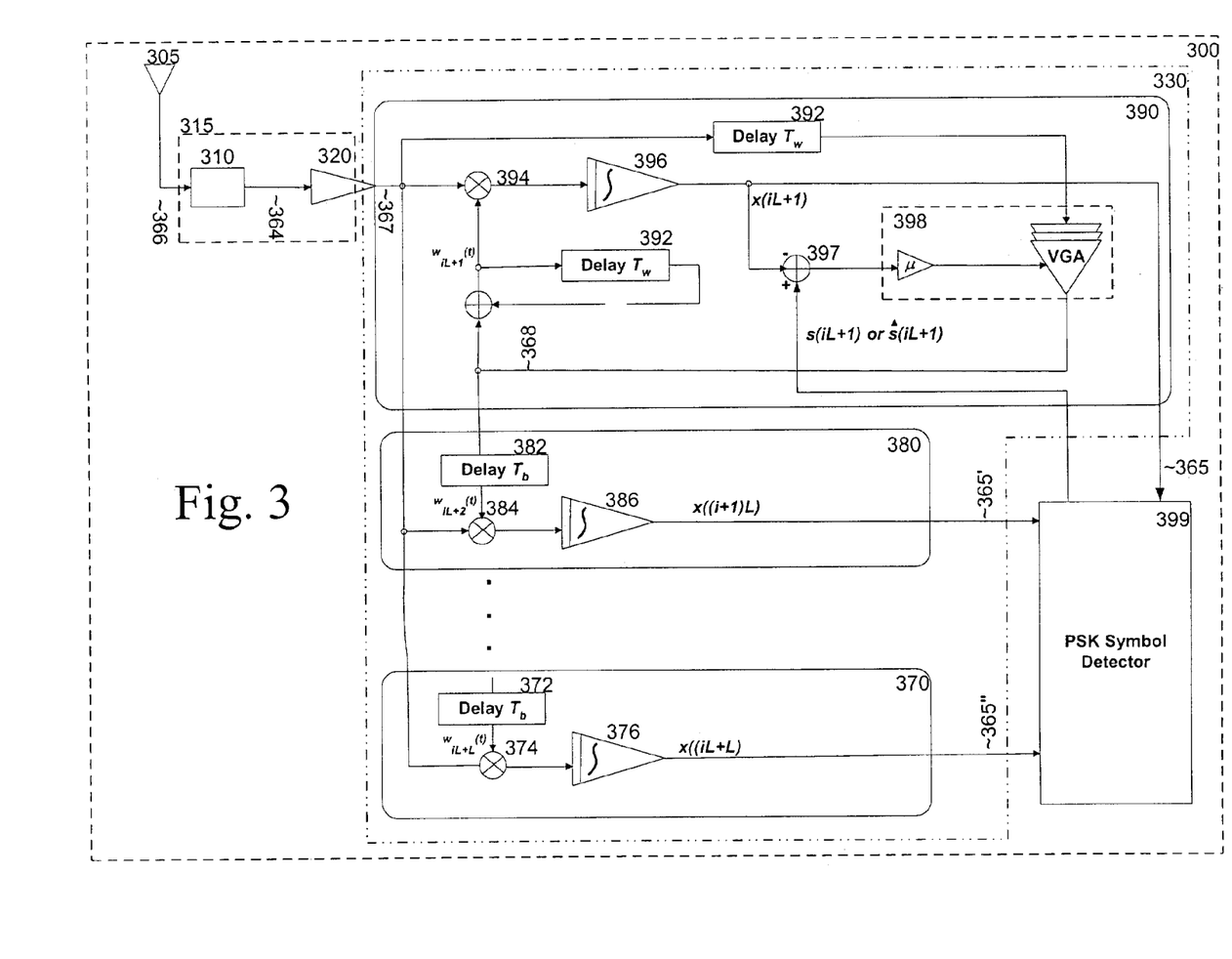
FIG. 3 is a block diagram illustrating a multi-branched embodiment of an apparatus in accordance with the disclosed matter.

FIG. 3 is a block diagram illustrating a multi-branched embodiment of an apparatus 300 in accordance with the disclosed matter. It is contemplated that other embodiments of the disclosed subject matter may exist that do not utilize a multi-branched filter. The apparatus may receive a UWB signal 366 via antenna 305. The signal may be isolated (isolated signal 364) and amplified by an amplification unit 315. The amplification unit may produce a received signal 367. The received signal may be filtered by an analog adaptive front end 330. The analog adaptive front end may attempt to, at least in part, suppress interference in the received UWB signal. It is contemplated that such interference may include, for example, multiple-access interference or intersymbol interference; however, other forms of interference may be suppressed. In one embodiment, the analog adaptive front end may perform adaptive filtering using a modified least means squared (LMS) function however, it is contemplated that other embodiments may utilize other filtering techniques. The analog adaptive front end may produce at least one symbol signal 365, 365' & 365". The symbol signal(s) may be processed by PSK symbol detector 399 that may extract information from the symbol signal.

The amplification unit 315 may include a bandpass filter 310 to isolate the UWB signal 366 and a low noise amplifier (LNA) 320 to amplify the isolated signal 364. It is contemplated that other components may be used to isolate and amplify the UWB signal.

The analog adaptive front end 330 may include a number of branches 390, 380 & 370. It is contemplated that one branch may exist for each observed symbol within an observation window. Accordingly, in this example embodiment, FIG. 3 illustrates an observation window of three symbols, and therefore, three branches. However, it is contemplated that any number, greater than one, of symbols may be observed. In one embodiment, if the observation window is only one symbol in duration, only one branch, e.g. the top circuit 390, may be required. By adding more branches, e.g., branches 380 & 370, the observation window may be expanded.

In this embodiment, each branch 390, 380 & 370 may include a delay component 392, 382 & 372, a multiplier 394, 384 & 374, and an integrator 396, 386, & 376, respectively. The delay component may delay an analog feedback signal 368. This feedback signal may be generated by a feedback path circuit. This feedback circuit may include an adder 397 to compare a processed version of the received signal with the output of the PSK symbol detector 399, and further include an amplifier 398. In one embodiment, the amplifier may include a variable gain amplifier; however, other embodiments may utilize other amplification techniques.

In one embodiment, the adder 397 may compute the difference between the training signal, or the feedback signal, i.e. s(iL+1), and the output of the integrator 396. The difference in sign information, illustrated in FIG. 3, may, in one embodiment, be used to control the positive or negative gain of the variable gain amplifier 398. It is contemplated that other forms of feedback amplification may be used, including, but not limited to, a multiplier, such as, for example multiplier 394. In the embodiment illustrated by FIG. 3, the feedback path is integrated with the first branch 390; however, it is contemplated that the feedback path may be a discrete component.

The multipliers 372, 382, & 392 substantially filter the received UWB signal utilizing the filter, or feedback, signal. The feedback signals stay within the circuit and thus no digital storage components are needed in this embodiment. The integrators 376, 386, & 396 produce a symbol signal utilizing the output of the multiplier. The PSK symbol detector 399 may then extract information from the symbol signal(s) received from the branches.

Figure 4:
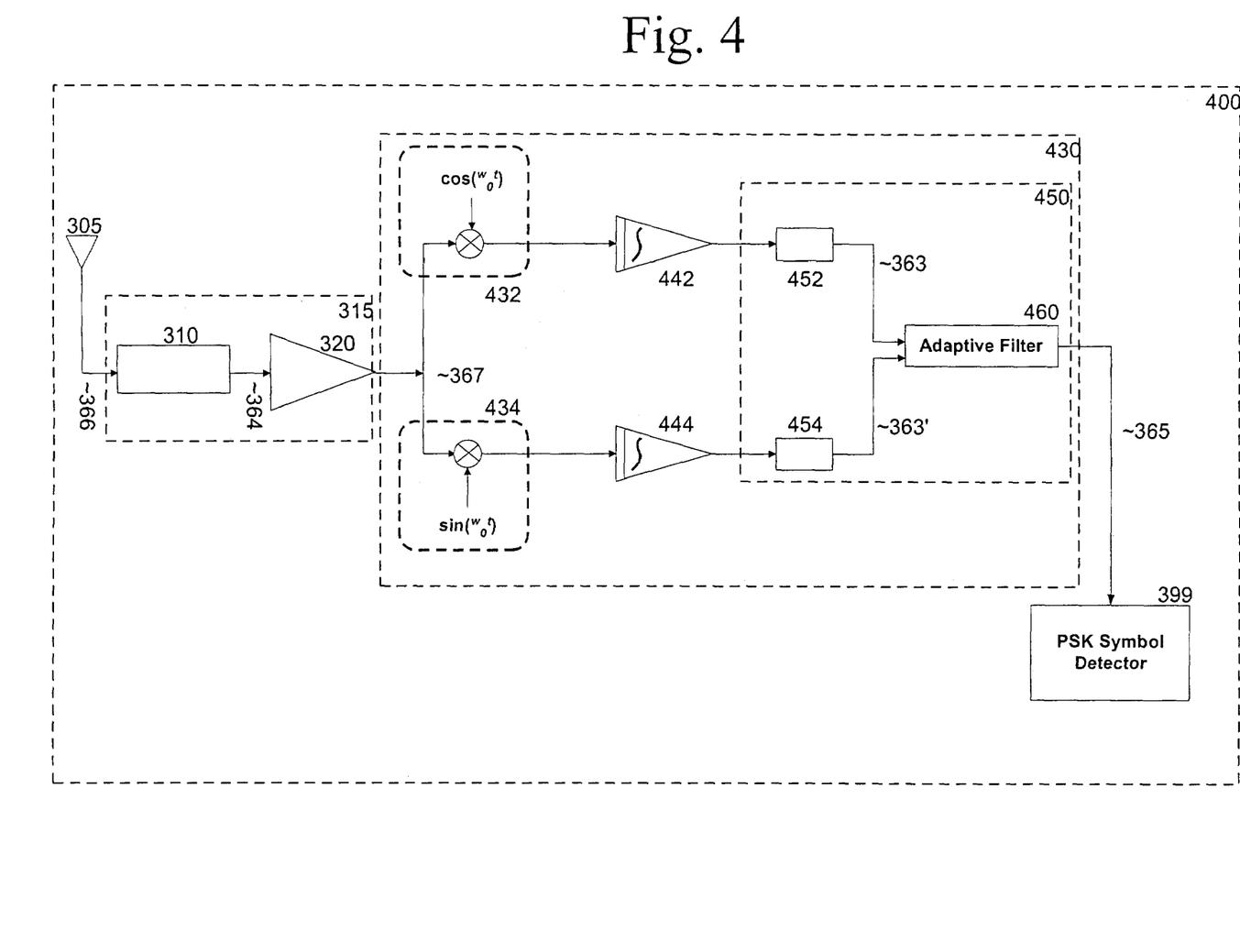
FIG. 4 is a block diagram illustrating an embodiment of an apparatus in accordance with the disclosed matter utilizing down converters.

FIG. 4 is a block diagram illustrating an embodiment of an apparatus 400 in accordance with the disclosed matter utilizing down converters. It is contemplated that other embodiments of the disclosed subject matter may exist that do not utilize down convertors. The apparatus may receive a UWB signal 366 via antenna 305. The signal may be isolated (isolated signal 364) and amplified by an amplification unit 315. The amplification unit may produce a received signal 367. The received signal may be filtered by an adaptive front end 430. The adaptive front end may attempt to suppress, at least in part, interference in the received UWB signal. It is contemplated that such interference may include interference, such as, for example, multiple-access interference or intersymbol interference; however, other forms of interference may be suppressed. In one embodiment, the analog front end may perform adaptive filtering using a modified least means squared algorithm; however, it is contemplated that other embodiments may utilize other filtering techniques. It is also contemplated that the adaptive front end may include analog components, digital components, or a mixture thereof. The adaptive front end may produce at least one symbol signal 395. The symbol signal(s) may be processed by PSK Symbol Detector 399 that may extract information from the symbol signal.

The adaptive front end 430 may include three stages: down converters 432 & 434, integrators 442 & 444, and an adaptive filtration stage 450. A received signal 367 is first bandpass filtered 310 and amplified 320. In one embodiment, the amplified signal may be a carrierless signal, i.e., a signal that does not use a carrier wave. The signal may include frequency components from $f_l$ to $f_u$, where $f_l$ and $f_u$ are the low and high end cut-off frequencies of the UWB signal.

In one embodiment, the carrierless signal may be down converted using down converters 434 & 432. The down converters convert the carrierless signal of f bandwidth into two signals 363 & 363' of f/2 bandwidth. In one embodiment, down converter 432 may generate a down converted signal 363 by multiplying the carrierless signal with a cosine wave signal. Down converter 434 may generate a down converted signal 363' by multiplying the carrierless signal with a negative sine wave signal. It is contemplated that other embodiments may utilize a different down conversion technique. This down conversion may reduce the Nyquist sampling rate of the produced two signals.

The integrators 442 & 444 may further reduce the required sampling rate of the respective down converted signals 363 & 363'. Traditionally, low or band pass filters are utilized after a down conversion stage. By utilizing integrators, the multipath energy, or energy of the two down converted signals, falls within the integration interval and results in a reduction of the required sampling rate.

The adaptive filtration stage 450, may attempt to suppress, at least in part, the multiple-access interference (MAI) and intersymbol interference (ISI) in the two down converted signals. In one embodiment, the adaptive filtration stage 450 may include digital components, such as, analog-to-digital converters 452 & 454 and a digital adaptive filter 460. One embodiment may include a digital least-means squared (LMS) filter as illustrated in FIG. 1. It is noted that the reduced required sampling rate resulting from the down converters and integration would greatly reduce the complexity of the digital adaptive filter. In another embodiment the analog adaptive filter 330 illustrated in FIG. 3, that includes a training stage and a decision-directed stage, may be used. However, the disclosed subject matter is not limited to the two illustrative examples.

Figure 5:
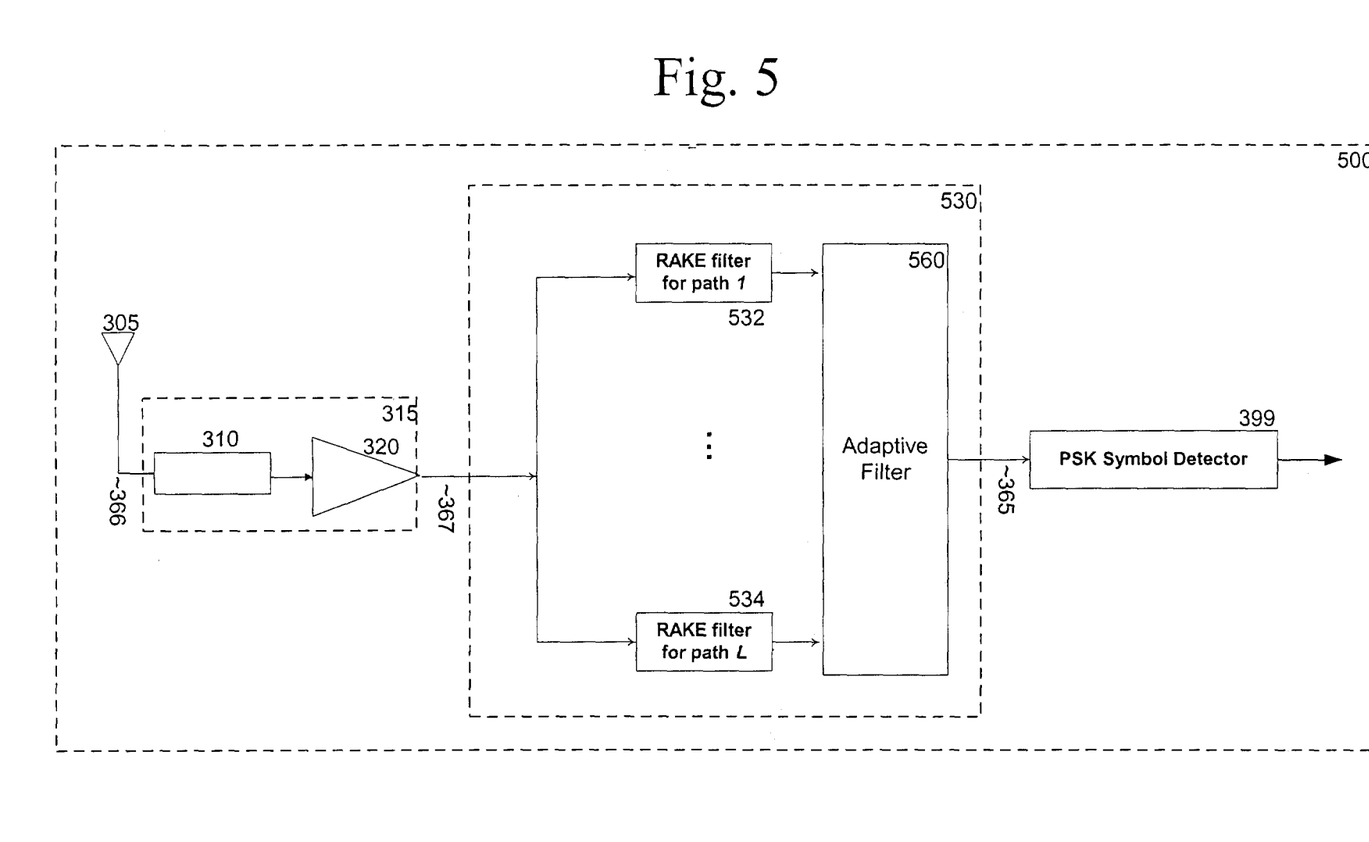
FIG. 5 is a block diagram illustrating an embodiment of an apparatus in accordance with the disclosed matter utilizing RAKE filters.

FIG. 5 is a block diagram illustrating an embodiment of an apparatus 500 in accordance with the disclosed matter utilizing RAKE filters. It is contemplated that other embodiments of the disclosed subject matter may exist that do not utilize down converters. The apparatus may receive a UWB signal 366 via antenna 305. The signal may be isolated and amplified by an amplification unit 315. The amplification unit may produce a received signal 367. The received signal may be filtered by an adaptive front end 530. The adaptive front end may attempt to suppress, at least in part, interference in the received UWB signal. It is contemplated that such interference may include, for example, multiple-access interference or intersymbol interference; however, other forms of interference may be suppressed. In one embodiment, the analog front end may perform adaptive filtering using a modified least means squared algorithm; however, it is contemplated that other embodiments may utilize other filtering techniques. The analog front end may produce at least one symbol signal 365. The symbol signal(s) may be processed by PSK Symbol Detector 399 that may extract information from the symbol signal.

The adaptive front end 430 may include a number of RAKE filters 532 & 534, and an adaptive filter 560. The RAKE filters often separates signals such that each finger only sees signals coming in over a single (resolvable) path. A conventional RAKE receiver, illustrated by FIG. 2, provides channel gain estimation and employs a combining module 280, such as, for example, a maximum ratio combiner or equal gain combiner, to combine the signal energy distributed in the paths. In one embodiment of the disclosed subject matter, illustrated by FIG. 5, the output of the RAKE filters may not be sent to a combining module, but instead to an adaptive filter 560. Utilizing an adaptive filter, the adaptive front end may implicitly find the channel gains and make use of them. The adaptive filter may include a training stage and a decision-directed stage. One embodiment of such an adaptive filter is illustrated by FIG. 3. In another embodiment, the adaptive filter may include analog-to-digital converters to sample the output of the RAKE filters at a time corresponding to the paths, and a digital adaptive filter. However, it is contemplated that other adaptive filters may be used.

Figure 6:
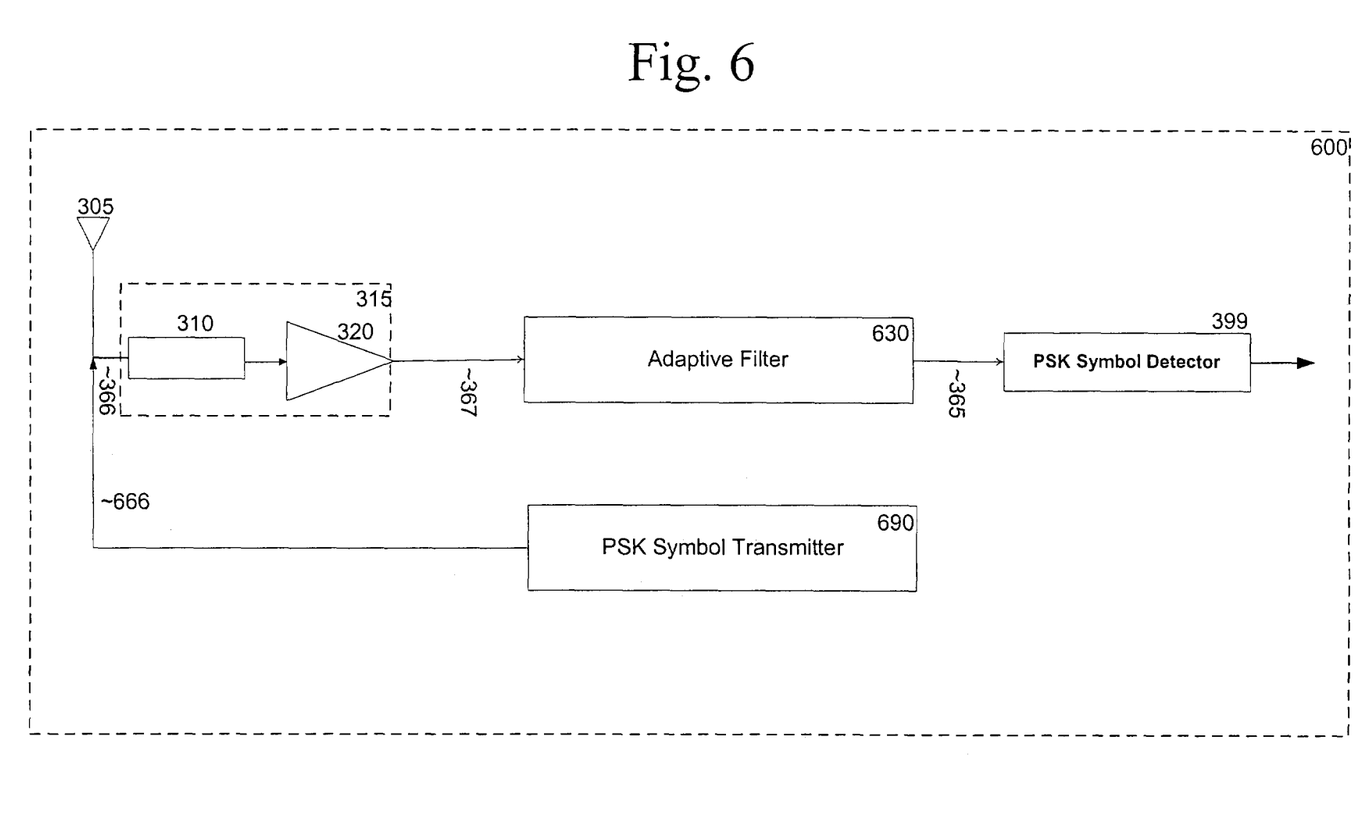
FIG. 6 is a block diagram illustrating an embodiment of a system in accordance with the disclosed matter.

FIG. 6 is a block diagram illustrating an embodiment of a system 600 in accordance with the disclosed matter. Such a system may include: an antenna 305, an amplification stage 315, an analog adaptive filter 630, a PSK symbol detector 399, and a PSK symbol transmitter 690. It is contemplated that the amplification stage 315, an analog adaptive filter 630, a PSK symbol detector 399 may receive an UWB signal 696 as described in the illustrative example embodiments above; however, the disclosed subject matter is not limited to only the illustrative examples. PSK symbol transmitter 690 may utilize antenna 305 to transmit an UWB signal 666.

Figure 7:
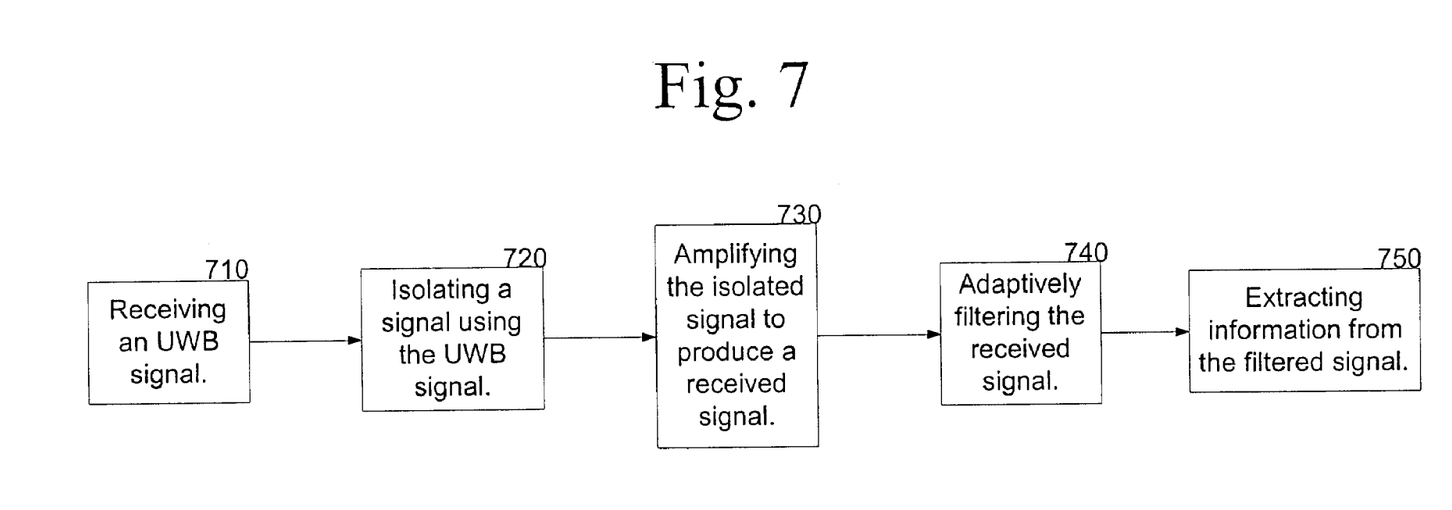
FIG. 7 is a flowchart illustrating an embodiment of a technique in accordance with the disclosed matter.

FIG. 7 is a flowchart illustrating an embodiment of a technique in accordance with the disclosed matter. Block 710 illustrates that such a technique may include receiving an UWB signal. Block 720 illustrates isolating a signal using the received UWB signal. Block 730 illustrates amplifying the isolated signal to produce a received signal. Block 740 illustrates adaptively filtering the received signal. It is contemplated that adaptively filtering may include any technique described in the illustrative example embodiments above; however, the disclosed subject matter is not limited to only the illustrative examples. For example, the filtering may include a training and decision-directed stage. Wherein the training stage includes a feedback system to train the filter to correctly recognize symbols, and the decision-directed stage isolated a recognizes the symbols. Block 750 illustrates extracting information from the filtered signal.

The techniques described herein are not limited to any particular hardware or software configuration; they may find applicability in any local and/or distributed computing or processing environment. The techniques may be implemented in hardware, software or a combination of the two. The techniques may be implemented in programs executing on programmable machines such as mobile or stationary computers, personal digital assistants, and similar devices that each include a processor, a storage medium readable by the processor (including volatile and non-volatile memory and/or storage elements), at least one input device, and one or more output devices. Program code is applied to the data entered using the input device to perform the functions described and to generate output information. The output information may be applied to one or more output devices.

Each program may be implemented in a high level procedural or object oriented programming language to communicate with a processing system. However, programs may be implemented in assembly or machine language, if desired. In any case, the language may be compiled or interpreted.

Each such program may be stored on a storage medium or device, e.g. compact read only memory (CD-ROM), digital versatile disk (DVD), hard disk, magnetic disk or similar medium or device, that is readable by a general or special purpose programmable machine for configuring and operating the machine when the storage medium or device is read by the machine to perform the procedures described herein. The system may also be considered to be implemented as a machine-readable storage medium, configured with a program, where the storage medium so configured causes a machine to operate in a specific manner. Other embodiments are within the scope of the following claims.

While certain features of the disclosed subject matter have been illustrated and described herein, many modifications, substitutions, changes, and equivalents will now occur to those skilled in the art. It is, therefore, to be understood that the appended claims are intended to cover all such modifications and changes that fall within the true spirit of the disclosed subject matter.

What is claimed is:

1. An apparatus comprising:
a front end utilizing an adaptive filter to suppress, at least in part, interference in a received Ultra-Wide Band (UWB) signal and produce at least one symbol signal, the front end comprising:
a number of branches, each including:
at least one digital adaptive filter to generate the symbol signal,
at least one analog-to-digital converter coupled to provide digital signals to the at least one digital adaptive filter,
at least one delay component to delay a feedback signal,
at least two frequency down converter units to facilitate the division of the received Ultra-Wide Band (UWB) signal into two signals each having half the bandwidth of the received UWB signal
at least one multiplier to multiply the input signal with the feedback signal, and
at least one integrator to facilitate reduction in sampling rate of the at least one analog-to-digital converter produce a symbol signal utilizing, at least in part, the output of the multiplier, wherein energy of the symbol signal that falls within the integration interval and results in a reduction of the required sampling rate; and
a phase shift key (PSK) symbol detector to extract information from the symbol signal.

2. The apparatus of claim 1, further comprising:
an amplification unit to facilitate the isolation and amplification of an Ultra-Wide Band (UWB) signal and produce the received UWB signal.

3. The apparatus of claim 2, the amplification unit comprising:
a band pass filter to facilitate the isolation of the Ultra-Wide Band (UWB) signal; and
a low noise amplifier to amplify the isolated signal.

4. The apparatus of claim 3, wherein the front end utilizes, at least in part, a Least-Means Squared filter.

5. The apparatus of claim 1, the front end comprising an analog circuit to suppress, at least in part, interference in a received Ultra-Wide Band (UWB) signal and produce at least one symbol signal.

6. The apparatus of claim 1, the number of branches comprising:
one branch for each observed symbol within an observation window; and
wherein the observation window includes at least one observed symbol.

7. The apparatus of claim 1, the front end further including:
a feedback signal generator to generate the feedback signal utilizing a feedback path and a variable gain amplifier.

8. The apparatus of claim 1, the front end further including:
a feedback signal generator to generate the feedback signal utilizing a feedback path and a multiplier.

9. The apparatus of claim 7, the feedback path comprising:
an adder to compare the symbol signal of a first branch to the information output of the Phase-Shift Key symbol detector.

10. The apparatus of claim 1, wherein the received Ultra-Wide Band (UWB) signal is a carrierless signal.

11. The apparatus of claim 1, the front end comprising:
a plurality of RAKE filters to split the received Ultra-Wide Band (UWB) signal into a plurality of signals; and
an adaptive filter to at least in part suppress interference in the received UWB signal and produce at least one symbol signal.

12. The apparatus of claim 11, the an adaptive filter comprising:
a plurality of analog-to-digital converters to sample the plurality of signals at a time corresponding to a path associated with each of the plurality of signals; and
a digital adaptive filter.

13. The apparatus of claim 11, wherein the adaptive filter is capable of determining a channel gain for each of the plurality of signals.

14. A system comprising:
an antenna to facilitate the reception and transmission of an Ultra-Wide Band (UWB) signal;
a PSK symbol transmitter to generate a UWB signal for transmission by the antenna; and
a UWB signal receiver including:
an amplification unit to facilitate the isolation and amplification of an Ultra-Wide Band (UWB) signal and produce a received UWB signal;
a front end utilizing an adaptive filter to suppress, at least in part, interference in the received UWB signal and produce at least one symbol signal, the front end further comprising at least:
a digital adaptive filter to generate the symbol signal,
at least two analog-to-digital converters to provide digital signals to the digital adaptive filter,
at least two integrator units to facilitate the reduction in the sampling rate of the analog-to-digital converter, wherein energy of the symbol signal that falls within the integration interval and results in a reduction of the required sampling rate, and
at least two frequency down converter units to facilitate the division of the received Ultra-Wide Band (UWB) signal into two signals each having half the bandwidth of the received UWB signal; and
a phase shift key (PSK) symbol detector to extract information from the symbol signal.

15. The system of claim 14, the signal receiver further comprising:
an amplification unit to facilitate the isolation and amplification of an Ultra-Wide Band (UWB) signal and produce a received UWB signal.

16. The system of claim 15, the amplification unit comprising:
a band pass filter to facilitate the isolation of the Ultra-Wide Band (UWB) signal; and
a low noise amplifier to amplify the isolated signal.

17. The system of claim 16, wherein the analog adaptive front end utilizes, at least in part, a Least-Means Squared filter.

18. The system of claim 14, the front end comprising:
a number of branches, each branch including:
a delay component to delay a feedback signal;
a multiplier to multiply the input signal with the feedback signal; and
an integrator to produce a symbol signal utilizing, at least in part, the output of the multiplier.

19. The system of claim 14, the number of branches comprising:
one branch for each observed symbol within an observation window; and
wherein the observation window includes at least one observed symbol.

20. The system of claim 18, the front end further including:
a feedback signal generator to generate the feedback signal utilizing a feedback path and a variable gain amplifier.

21. The system of claim 18, the front end further including:
a feedback signal generator to generate the feedback signal utilizing a feedback path and a multiplier.

22. The system of claim 21, the feedback path comprising:
an adder to compare the symbol signal of a first branch to the symbol of the output of the phase-shift key symbol detector.

23. The system of claim 14, wherein the received Ultra-Wide Band (UWB) signal is a carrierless signal.

24. The system of claim 14, the front end including:
a plurality of RAKE filters to split the received Ultra-Wide Band (UWB) signal into a plurality of signals; and
an adaptive filter to at least in part suppress interference in the received UWB signal and produce at least one symbol signal.

* * * * *